March 1, 1955 P. M. HALL 2,703,357
WELDING ELECTRODE AND MEANS FOR EJECTING SAME FROM HOLDER
Filed April 21, 1952
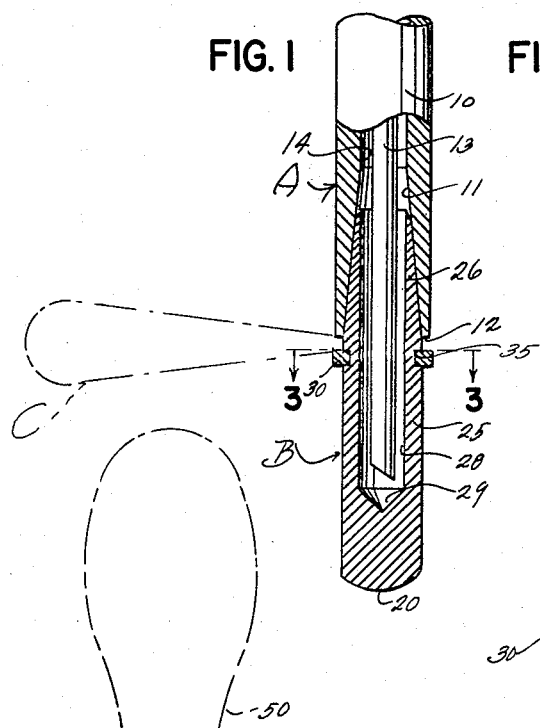
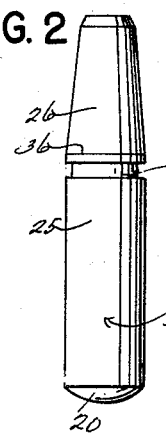
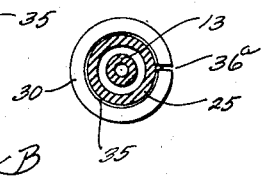
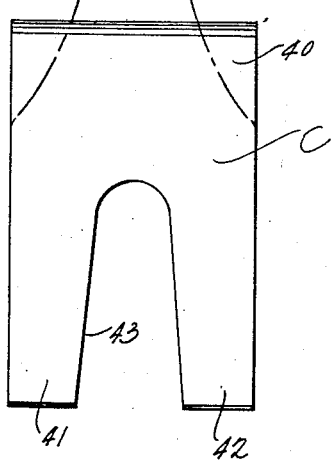
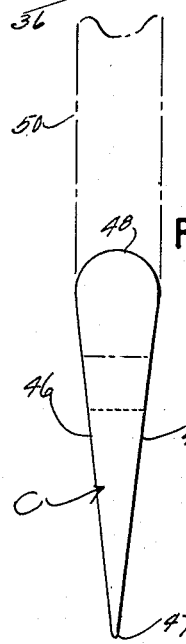
Inventor
Preston M. Hall
By Lancaster, Allwine & Rommel
Attorneys

# United States Patent Office 2,703,357
Patented Mar. 1, 1955

2,703,357

WELDING ELECTRODE AND MEANS FOR EJECTING SAME FROM HOLDER

Preston M. Hall, Roger Heights, Md.

Application April 21, 1952, Serial No. 283,437

2 Claims. (Cl. 219—4)

This invention relates to improvements in welding electrodes, for use in resistance welding machines having means to facilitate removal from the holders thereof.

The primary object of this invention is the provision of an easily removable electrode tip for the holders of resistance type electric welding machines where ejectors for removal of the tips cannot be used, such as in connection with multiple head press type welders or where special application of the holders and tips is engineered to fit job requirements, such as in gun welders, etc.

A further object of this invention is the provision of a relatively simple type of electrode tip for welding machines having a durable and effective means associated therewith to facilitate removal of the tip from its holder.

A further object of this invention is the provision of an electrode tip for resistance type welding machines having a body portion provided with a laterally projecting flange of a different and more durable material than the tip itself, in such relation that when the tip is applied to a holder the flange will be spaced a proper distance from the extreme end of the holder to enable the insertion of a wedge type removing tool.

I am fully aware that heretofore it has been proposed to provide electrodes and electrode holders with means to facilitate the removal of the tip from its holder. As a matter of fact, a wedge type removing tool is shown in my U. S. Patent 2,390,936. However, in connection with the electrode therein shown, a bushing or adapter is used, and the wedge application is made upon the bushing. That construction is not similar to the invention of this application, because space confinement of many types of welding machines requires that adapters not be used. Clearance for work is very important in connection with welding equipment of such types, and it is therefore impractical to utilize special adapters, etc. From a cost angle, such complicated holding means is also impractical, and one of such types is shown in my U. S. Patent 2,374,284. I am also aware that heretofore it has been proposed to provide rotatable means to effect disconnection of the tip from its holder, and in this connection reference is made to such means as shown in U. S. Patents 2,374,348 and 2,442,798. The movement required of these devices constitutes an impractical means for removal of the tip, since friction developed between the surfaces of the metals becomes too great and indeed is stopped before the tip becomes loosened. Furthermore, rotating devices are space encumbering and will not admit of that closeness in positioning of electrode tips required for multiple point and other compound resistance welding machines. It is therefore proposed by me to provide means directly upon the body of the electrode itself in such facing and spaced relation with respect to that portion of the body of the holder which directly receives the electrode tip as to enable the practical application of a wedging tool for tip removal.

Other objects and advantages of this invention will be apparent during the course of the following detailed description.

In the accompanying drawing, forming a part of this specification, and wherein similar reference characters designate corresponding parts throughout the several views:

Figure 1 is a fragmentary view, partly in longitudinal section, showing an improved electrode tip constructed according to this invention and seated directly in a holder; a wedging tool being shown in dot and dash lines, positioned for easy removal of the tip from the holder body.

Figure 2 is a side elevation of the improved electrode.

Figure 3 is a transverse cross sectional view taken substantially on the line 3—3 of Figure 1, and more particularly showing a snap type spring ring associated with the body of the holder to provide a durable flange properly spaced from the extreme end of the holder body to facilitate the application of a tip removal tool thereto.

Figure 4 is an enlarged transverse cross sectional view of the snap washer or ring, showing how the same is constructed to avoid marring and damage to the tapered seating end of the tip as a result of application of the snap ring into position upon the body of the tip.

Figure 5 is an elevational view of a wedge type tool used to facilitate removal of the electrode tip.

Figure 6 is an edge elevation of the tool of Figure 5.

In the accompanying drawing, wherein for the purpose of illustration is shown only a preferred embodiment of the invention, the letter A may generally designate a conventional electrode tip holder of a welding machine, upon which the improved electrode B is adapted to be applied. A tool C may be used for removal of the tip B from the holder A.

The holder A preferably comprises a body portion 10, which may be of a shape suitable to serve the purpose for which the electric welding machine is used. Generally such holders are circular, but they may vary in cross sectional shape, such as in connection with multiple head welding machines and other special applications. The seating end of the holder A is provided with an internal tapered seat 11, converging downwardly towards the extreme marginal end or edge 12 of the tip, and this tapered seat receives the electrode B in frictional seating engagement therein. A conventional tube 13 may be provided in the passageway 14 of the holder A for receiving the cooling fluid in accordance with well-known practice.

The electrode B may vary in shape, to suit work applications. In the drawing a straight type welding electrode is shown, having a radius tip 20. The type of tip for the electrode may vary in shape, according to practice, and the electrode B may be of the offset, irregular or swivel type. The electrode B includes a cylindrical body portion 25 having a seating end 26 tapered to conform to the tapered passageway 11 of the holder A. The dimensional characteristics of these tapers is such that even under extreme pressures to which subjected, the electrode will project for the proper distance from the holder to suit work requirements. The electrode body 25 has the usual chamber 28 therein, into which the water cooling tube 13 projects; the chamber 28 terminating in a dead end 29 short of the welding tip 20. Electrodes of this sort are constructed of materials which have proper conductivity, and for that reason the usual alloy does not possess physical properties which will enable, without damage, much pounding or the application of wrench or other prying action thereon to effect its removal. Since I employ wedge action between the holder and some part of the electrode to effect removal of the latter, I propose to employ a member 30 of non-corrosive metal having the required hardness to withstand pounding and wedging forces, so that such will not be imparted to the electrode material, except indirectly. To that end I have annularly grooved the electrode body 25, at 35, a pre-determined distance below the terminal 36 of the taper upon the seating portion of the electrode. While I do not wish to be limited to any particular dimensions, for conventional electrodes, this distance will be one-sixteenth of an inch, although such may vary according to the size of the electrode and the nature of the machine in which it is to be used. The width of the groove 35 measured longitudinally of the axis of the electrode is preferably one-eighth of an inch, and the depth of the groove may be one-sixteenth of an inch. I propose to use one-eighth of an inch square stock for construction of the spring type split ring or washer 30. The passageway 35a through the ring 30 may be expanded because of the split 36a in the ring, but at its top and bottom the passageway 35a is flared or bevelled at 36. This enables the split ring to be slipped over the tapered exterior of the electrode without injury to the electrode as the ring is moved onto the electrode and snapped into place in its seating groove 35. The spring ring is preferably constructed of non-magnetic stainless steel, or it may be constructed of beryllium copper. It has a hardness and toughness sufficient to withstand all wedging shocks incidental to removal of the tip from its holder, without damage.

The wedging tool C preferably comprises a head or body portion 40 and leg portions 41 and 42 spaced to provide a tapered way 43 for straddling the electrodes. The sides 45 and 46 are tapered to the reduced application end 47 of the legs 41 and 42, and the head edge 48 may be rounded to permit hammering. If desired, a handle, shown in dot and dash lines at 50 may be used upon the head portion 40. In lieu of this, any suitable bifurcated tool may be used, just so the points will straddle the holder and there is a sufficient taper and wedging action in the space between the edge 12 of the holder and the facing annular projecting flange of the ring 30. It will be understood by those skilled in the art that with such a construction the electrode can be easily removed from its holder.

I do not wish to be precisely limited to the use of a split spring washer, since it is entirely feasible to provide other projections upon the body of the electrode within the scope of the present invention.

Various changes in the shape, size, and arrangement of parts may be made to the form of invention herein shown and described without departing from the spirit of the invention or scope of the claims.

I claim:

1. An electrode for resistance type welding machines comprising a body portion having a tapered end which is adapted to fit to a predetermined length into the holder of a welding machine, the body portion at a location thereon spaced from the end which fits into the holder of the machine having an endless groove circumferentially thereabout, and an electrode ring seated in said groove against endwise movement along the body portion having a portion thereof which projects beyond the outer circumferential surface of the body portion and provides a shoulder facing the end of the body portion which fits into the holder of the welding machine, the electrode body being constructed of high electrically conductive metal and the ring being constructed of metal which is appreciably harder and tougher than the body of the electrode.

2. An electrode as defined in claim 1 wherein the ring is constructed of non-magnetic metal such as stainless steel or beryllium copper.

References Cited in the file of this patent

UNITED STATES PATENTS

| | | |
|---|---|---|
| 2,389,946 | Wisler | Nov. 27, 1945 |
| 2,390,936 | Hall | Dec. 11, 1945 |
| 2,422,962 | Hensel | June 24, 1947 |
| 2,442,798 | Crabtree | June 8, 1948 |
| 2,475,209 | Tucker | July 5, 1949 |